United States Patent [19]
Smith et al.

[11] Patent Number: 5,228,277
[45] Date of Patent: Jul. 20, 1993

[54] REAR DISCHARGE REEL MOWER HAVING MULTI-PURPOSE ROTARY BRUSH

[75] Inventors: Larry N. Smith, Beaver Dam, Wis.; Stephen D. Mayberry, Ottumwa, Iowa; Richard L. Forest, Colona, Ill.

[73] Assignee: Deere & Company, Moline, Ill.

[21] Appl. No.: 824,669

[22] Filed: Jan. 23, 1992

[51] Int. Cl.⁵ .................... A01D 34/48; A01D 34/54; A01D 34/62
[52] U.S. Cl. ............................. 56/16.9; 56/202; 56/249; 56/DIG. 12
[58] Field of Search .............. 56/7, 16.9, 202, 209, 56/249, DIG. 12

[56] References Cited

U.S. PATENT DOCUMENTS

| | | | |
|---|---|---|---|
| 1,379,555 | 5/1921 | Goodfellow | 56/249 |
| 2,043,148 | 6/1936 | Blondeau | 56/249 |
| 2,209,309 | 7/1940 | George | 56/DIG. 12 X |
| 3,816,985 | 6/1974 | Sorenson et al. | 56/7 |
| 3,918,239 | 11/1975 | Aldred et al. | 56/7 |
| 4,021,996 | 5/1977 | Bartlett et al. | 56/7 |
| 4,991,384 | 2/1991 | Steckly | 56/202 |
| 5,134,838 | 8/1992 | Swisher et al. | 56/DIG. 12 X |

OTHER PUBLICATIONS

Deere Operator's Manual relating to the model 2243 Professional Greensmower (cover page, both sides, and p. 70), dated Mar. 1990.
Jacobsen Brochure (cover page and p. 24), dated Jan. 1989.

Primary Examiner—George A. Suchfield

[57] ABSTRACT

A mower cutting unit is provided with a rear-mounted grass catcher. The cutting unit includes front and rear rollers and mounted between the rear roller and the grass catcher is a rotary brush. The brush is mounted for adjustment into and away from engagement with the rear roller and for adjustment into and away from engagement with the turf. The brush may be driven either in the same direction as or counter to the direction of rotation of the rear roller during forward mowing operation. When driven counter to the direction as the rear roller, the brush may either be positioned for only cleaning clippings from the rear roller and depositing them into the grass catcher or be positioned for additionally sweeping the turf. When the brush is driven in the same direction of rotation as the rear roller, it operates, depending on its positional relationship to the rear roller and turf, to either only clean the rear roller, to clean the rear roller while sweeping the turf to disperse clippings or to just sweep the turf to disperse clippings.

13 Claims, 4 Drawing Sheets

REAR DISCHARGE REEL MOWER HAVING MULTI-PURPOSE ROTARY BRUSH

BACKGROUND OF THE INVENTION

The present invention relates to a reel mower such as that used for mowing golf greens or fairways or for mowing sports arenas, for example, and more specifically relates to the usage of a rotary brush with such a mower.

Grass clumping is a problem attendant with reel mower cutting units for cutting any grassy areas where a even length of cut is desired, golf greens or fairways being typical of such areas. Clumping is especially a problem when such cutting units are equipped with rear-mounted grass catchers since sticky grass clippings tend to cling to the catcher structure and then fall onto the rear roller or between the rear roller and the bedknife support where the clippings collect and eventually fall off in clumps which detract from the appearance of the turf.

Another problem which occurs in the growing and care of golf course turf, especially that used on greens, is that the grass sends out runners which tend to become matted and the traversing of the grass by mowers tends to cause the grass to become oriented in the same direction such that a graining condition is caused which is undesirable for putting.

It is known to mount a bristle brush to sweep the turf forwardly of a reel mower cutting unit for the purposes of lifting runners, controlling graining and picking up matted growths. It is also known to mount a rotary brush adjacent the rear roller of a reel mower cutting unit for the sole purpose of keeping the rear roller free of grass build-up to ensure a consistent height of cut and to prevent unsightly clumps of grass from being deposited on the turf surface. Examples of such rotary brushes are disclosed in U.S. Pat. No. 3,816,985 granted on Jun. 18, 1974 to Sorenson et al and U.S. Pat. No. 4,021,996 granted on May 10, 1977 to Bartlett et al.

SUMMARY OF THE INVENTION

According to the present invention there is provided a reel mower cutting unit having a novel rotary brush attachment.

A feature of the invention is to provide a cutting unit having at least a rear gauge roller and being equipped with a rotary brush that is mounted for performing one or more tasks in addition to and either separately or concurrently with cleaning clippings from the rear gauge roller.

A more specific feature of the invention is to provide a rotary brush which is mounted behind the rear roller of a reel mower cutting unit for performing one or more of the functions of cleaning the roller, conditioning the turf and dispersing clumps, when a grass catcher is not used, or for additionally performing the function of delivering clippings to the grass catcher when a grass catcher is used.

A further feature of the invention is to provide an adjustable rotary brush in combination with a grass catcher wherein a lower lip of the entrance of the catcher is made in the form of a cut-off bar located in close proximity to the brush so as to strip grass clippings from the brush so that they are deposited in the catcher rather than being partially carried around by the rotary brush and deposited back onto the turf.

Another feature of the invention is to provide a drive for the rotary brush which will permit the brush to be driven either in the same, or in the opposite, direction as the rear roller and to provide an adjustment for the brush permitting it to be moved towards and away from the turf and/or the rear roller such that the brush may be used to simultaneously clean the rear roller of clippings and to brush the turf to thereby alleviate matting and graining conditions while at the same time dispersing clippings.

These and other features will become more apparent from a reading of the ensuing description together with the appended drawings.

DESCRIPTION OF THE PREFERRED EMBODIMENT

Preliminarily, it is to be noted that at various places in the description parts or elements will be referred to as occurring in pairs while only one of the pair is shown. It is to be understood that the part or element not shown is similar to or the same as the one illustrated.

Figure 1:
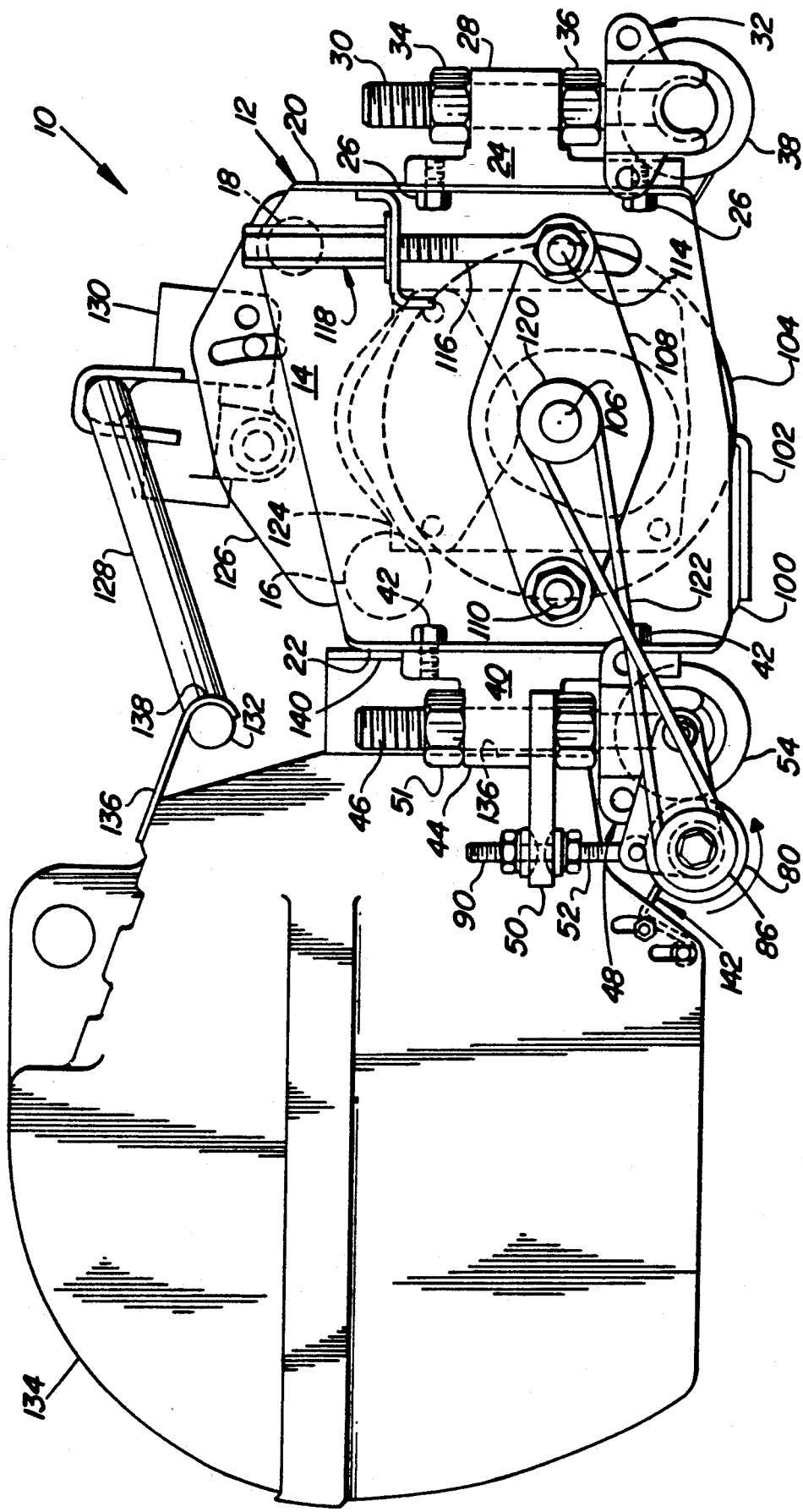
FIG. 1 is a right side elevational view of a reel-type cutting unit embodying a rotary brush in accordance with the principles of the present invention, with the brush being shown positioned for sweeping grass clippings off the turf and the rear roller and rotated for delivering the clippings to the grass catcher.

Referring now to FIG. 1, there is shown a reel-type cutting unit 10 including a frame 12 defined by opposite side plates 14 interconnected by an upper rear tubular cross member 16 and an upper forward cross member 18. Formed at the front and rear of each side plate 14 are front and rear out turned flanges 20 and 22, respectively, which define respective vertical mounting surfaces. Each of the front flanges 20 has a front roller support bracket 24 secured thereto by vertically spaced bolts 26 which extend forwardly through apertures in the flanges 20 and are threaded into tapped holes provided in the brackets 24. Each of the support brackets 24 defines a forward projection 28 having a vertical hole drilled therethrough and loosely receiving a threaded adjustment post 30 forming part of a front roller mounting bracket 32. Upper and lower adjustment nuts 34 and 36, respectively, are received on each post 30 at locations respectively above and below upper and lower horizontal surfaces of an associated projection 28. A front roller 38 extends between and is rotatably supported by the mounting brackets 32.

Figure 5:
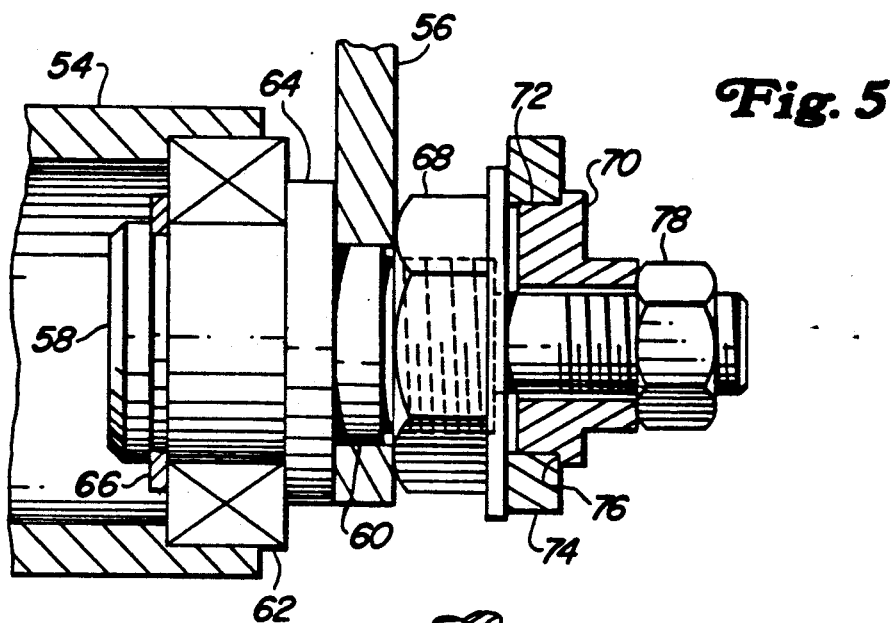
FIG 5 is a sectional view taken along the line 5—5 in FIG. 2 and showing he details of the mounting for the rear roller and for the brush supporting arm.
Figure 6:
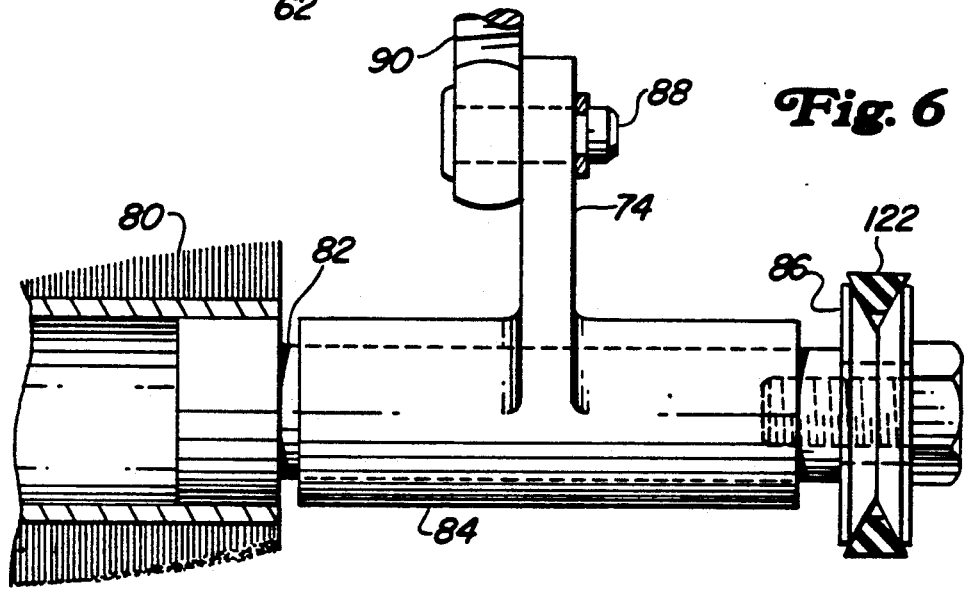
FIG. 6 is a sectional view taken along the line 6—6 of FIG. 2 and showing the means for supporting the brush spindle.
Figure 7:
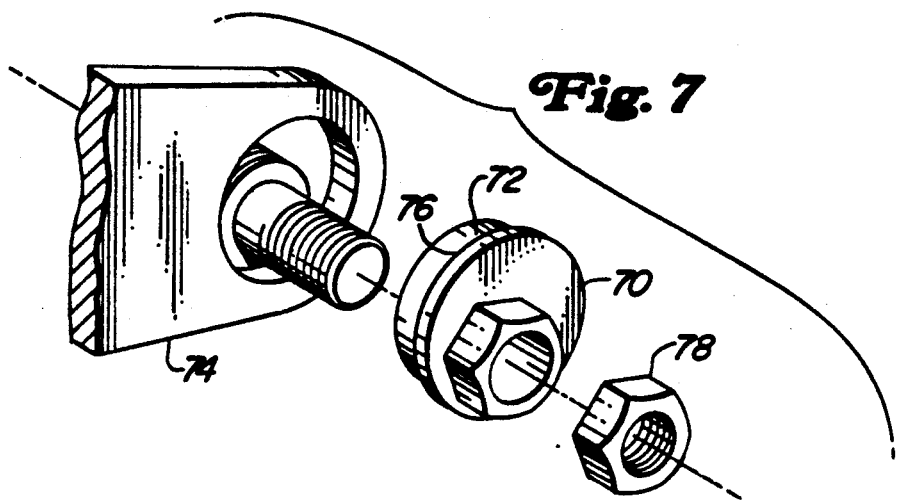
FIG. 7 is a right rear perspective view of the eccentric mechanism for providing adjustment of the brush toward and away from the rear roller.

Each of the rear flanges 22 is provided with vertically spaced apertures and has a rear roller support bracket 40 secured thereto by a pair of bolts 42 which extend rearwardly through the apertures in the flange 22 and are threaded into tapped holes provided in the bracket 40. Each bracket 40 defines a rearward projection 44 having a vertical hole provided therein and loosely receiving a threaded vertical post 46 of a rear roller mounting bracket 48. A brush adjustment post support bracket 50 is received on and projects rearwardly from each post 46 below the projection 44 and, upper and lower nuts 51 and 52 are respectively received on each post 46 at locations respectively above and below an associated bracket projection 44 and the support bracket 50 and are tightened against upper and lower horizontal surfaces respectively of the projection and bracket, with the result that each bracket 50 is cantilever mounted. A rear roller 54 extends between vertical legs 56 of the brackets 48 and, as shown in FIG. 5, includes oppositely projecting spindles 58 having square section portions 60 captured in complementary shaped holes provided in the legs 56. At the inner end of each of the spindles 58 is a bearing 62 that is tightly received in the roller shell and is held in place against an inside surface of a shoulder 64 of the spindle by a snap ring 66. A flange nut 68 is received on a threaded section of the spindle 58 and clamps the leg 56 tightly against the outer side of the shoulder 64. The spindles 58 each include a threaded extension which projects outwardly beyond the nut 68 and received on the extension is an eccentric element 70 having an annular surface 72 disposed in eccentric relationship to the axis of the spindle. Received on the surface 72 of each of the eccentric elements 70 is a forward corner of a triangular brush support arm 74, the corner being clamped between the flange nut 68 and a shoulder 76 of the eccentric element 70 by a nut 78 received on the threaded extension of the spindle 58 and tightened against the eccentric element 70.

A rotary brush 80 is located behind the rear roller 54 and includes spindles 82 projecting from opposite ends thereof and being respectively rotatably received in cylindrical receptacles 84 forming respective lower rear corners of the brush support arms 74. Fixed to an outer end of the right hand spindle 82 is a driven pulley 86.

Pivotally coupled to an upper rear corner of each of the brush support arms 74, as by a pin 88, is a threaded brush adjustment post 90 which extends through an aperture provided in a respective one of the adjustment support brackets 50, the post 90 loosely carrying spherically faced washers 92 and 94 which are received in correspondingly shaped surfaces provided on the top and bottom of the bracket 50. Adjustment nuts 96 and 98 are respectively located on each of the posts 90 at locations above and below the washers 92 and 94, whereby the nuts may be used to raise and lower the associated brush support arm 74 relative to the turf surface and the rear roller 54.

Referring once again to FIG. 1, there is shown a u-shaped bed knife support 100 having its opposite ends secured to the opposite side plates 14 of the cutting unit frame 12. A bed knife 102 is secured tightly against a transverse, flat horizontal surface of the support 100 by a plurality of plow bolts (not shown).

A reel 104 is positioned approximately midway between the rollers 38 and 54 and includes a shaft 106 having opposite ends journalled in opposite diamond-shaped bearing housings 108 mounted to the side plates 14 by rear bolts 110, which define a horizontal pivot axis for the housings, and by forward bolts 112 that are located in arcuate slots 114 formed at a radius about the bolts 110 and are pivotally coupled to a threaded adjustment post 116 forming part of a reel adjustment mechanism 118. The right hand end of the reel shaft 106 is extended outwardly beyond the right hand bearing housing 108 and has a brush drive pulley 120 attached thereto. The pulley 120 is in fore-and-aft alignment with and is connected for driving the brush pulley 86 by a brush drive belt 122. The reel 104 includes a plurality of blades (not shown) which sweep along a circular path that passes extremely close to the cutting edge of the bedknife 102 so that grass is brought against the bedknife and cut off by the cutting blades. A reversible hydraulic motor (not shown) is mounted on the left side plate 14 and acts through gearing contained in a gear housing 124 for driving the reel 104 in a clockwise direction for cutting grass or in a counterclockwise direction for backlapping operation.

Figure 2:
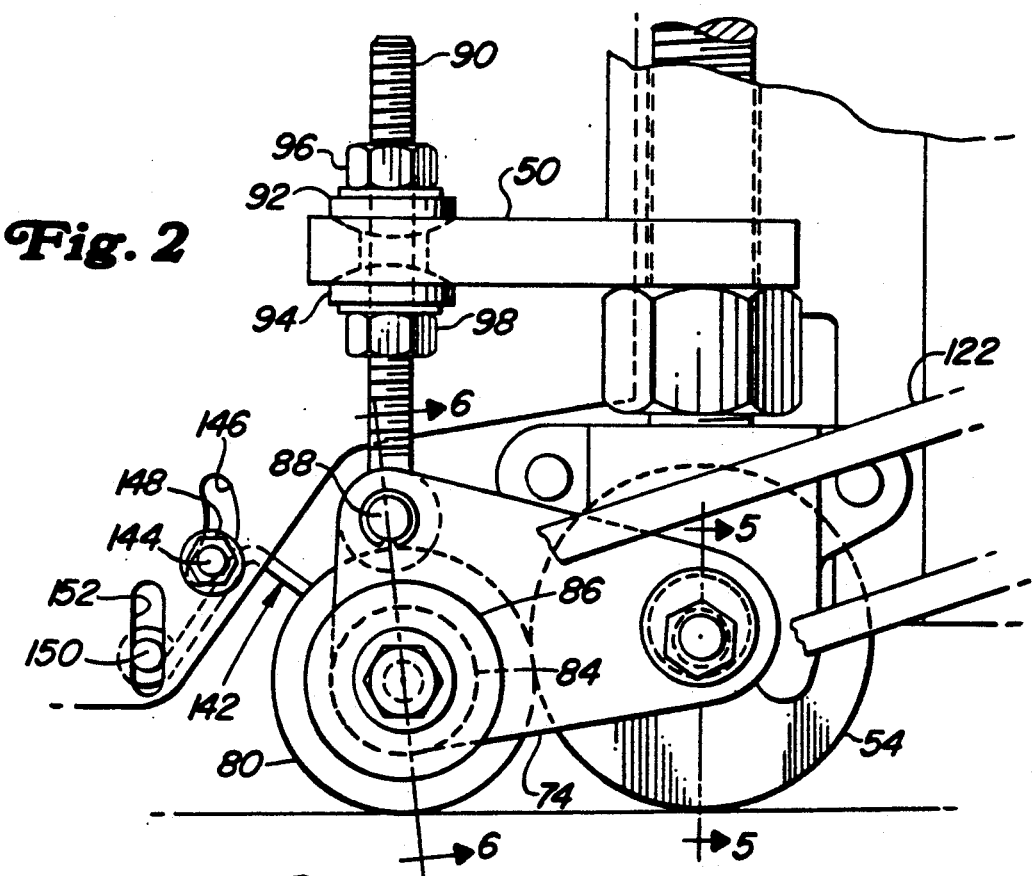
FIG. 2 is an enlarged view of a portion of FIG. 1 showing the adjustable brush mounting.
Figure 3:
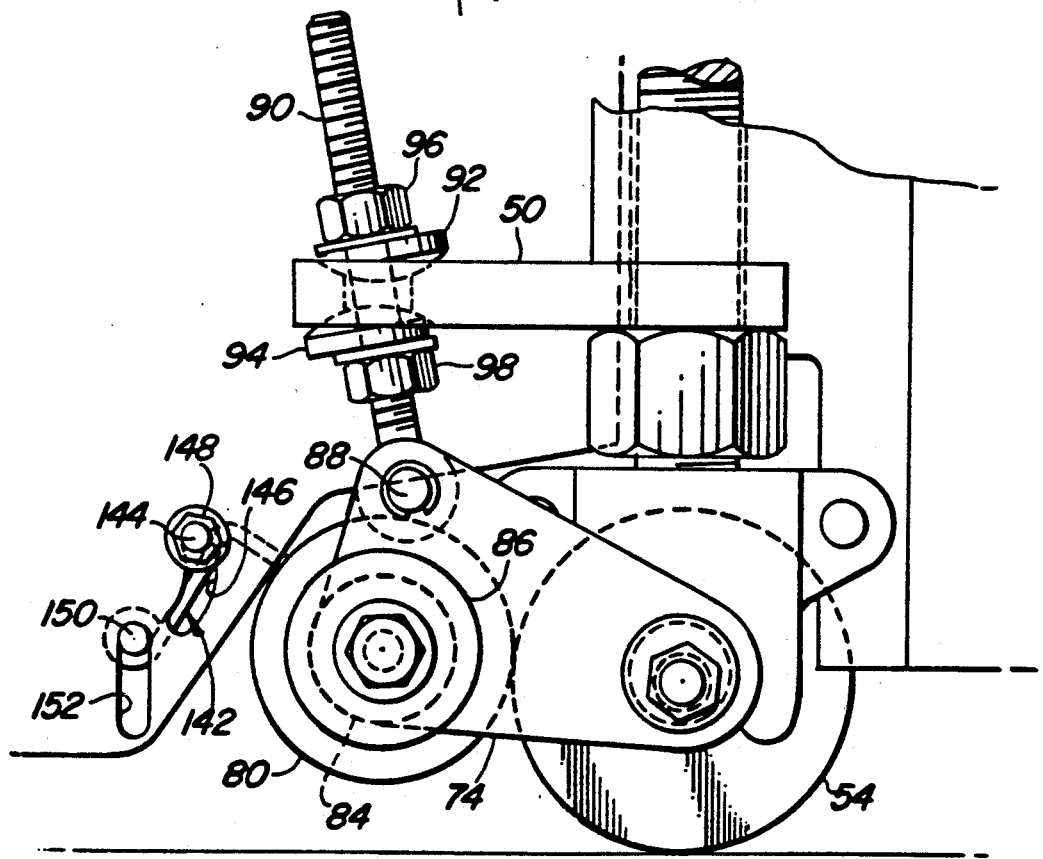
FIG. 3 is a view like FIG. 2 but showing the brush mounting adjusted so as to dispose the brush in a raised position wherein it acts only to brush clippings from the roller and deliver the same to the grass catcher.
Figure 4:
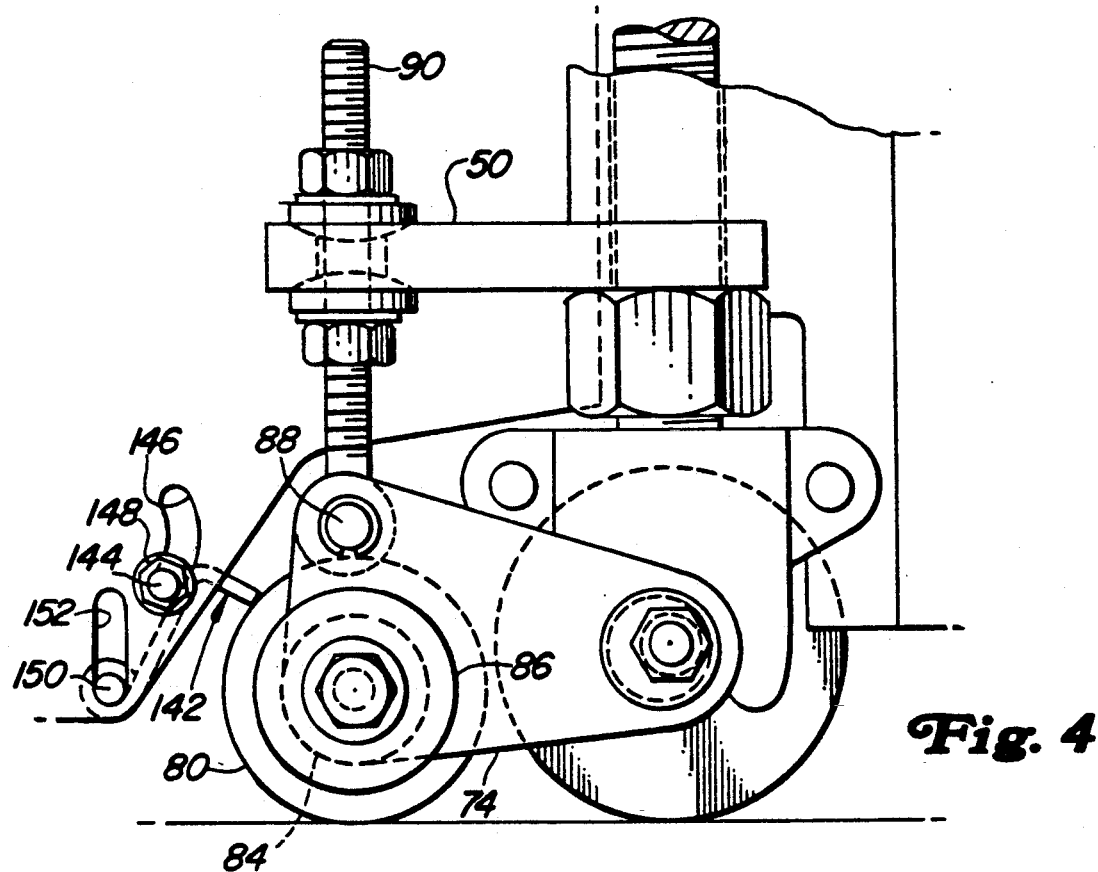
FIG. 4 is a view like FIG. 2 but showing the brush in a lowered position away from the roller wherein it acts only to condition the turf and disperse clumps when the brush is driven clockwise and acts also to carry clippings toward the grass catcher when the brush is driven counterclockwise, with the direction of rotation being chosen depending on the desired effect.
Figure 8:
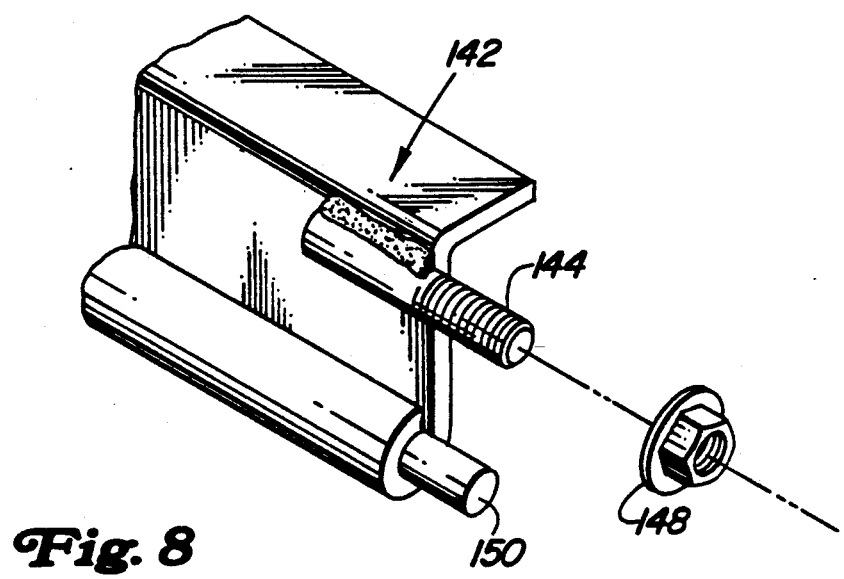
FIG. 8 is a right rear perspective view showing the right end portion of the adjustable cut-off bar.

The frame 12 includes an upper shield 126 which extends between and is fixed to the side plates 14. A u-shaped grass catcher or basket support bracket 128 is constructed of tubular material and has opposite legs extending rearwardly from a central bight portion that is fixed to a cutting unit support bracket 130 mounted to a central location of the shield 126. The legs of the bracket 128 each have a rear end defined by an out-turned cylindrical portion 132. A grass catcher or basket 134 is provided with a pair of hanger straps 136 which project forwardly from upper forward, transversely spaced locations and terminate in rearwardly opening, semi-cylindrical ends 138 that are respectively engaged with the cylindrical portions 132 of the support brackets 128. The walls having out-turned, vertical flanges 140 engaged with an adjacent one of the rear out-turned flanges 22 of the side plates 14, this engagement resulting in the grass catcher being properly disposed for catching grass. The bottom of the open front of the catcher 134 is formed by an angular cut-off bar 142 which is adjustably mounted so that it may be disposed in close proximity to the path swept by the bristles of the brush 80 for every adjusted position of the brush. Specifically, welded to the opposite ends of the cut-off bar 142 are respective threaded adjustment studs 144 that project outwardly through respective arcuate adjustment slots 146 provided in the opposite side walls of the catcher 134, a nut 148 being tightened onto each stud 144 to hold it in place. As can best be seen in FIG. 8, the bottom end of one of the legs of the cut-off bar 142 is rolled about a guide pin 150 having opposite ends that project through respective, upright guide slots 152 provided in the opposite side walls of the catcher 134. Thus, it will be appreciated that when the brush 80 is rotating counterclockwise or counter to the direction of rotation of the rear roller 54 the bar 142 will act to strip grass clippings carried by the brush 80, whereby the clippings will be deposited into the catcher. It is to be noted that this direction of rotation of the brush 80 will occur if the belt 122 is twisted, as shown in FIG. 1, at a location between the pulleys 86 and 120. The belt 122 will not be twisted if it is desired to drive the brush 80 clockwise, or in the same direction of rotation as the reel 104 and rear roller 54 to perform only one or more of the functions of cleaning clippings from the rear roller 54, of brushing the turf so as to straighten up grass that has been bent over, as by the passage of the front and rear rollers 38 and 54 for example, and/or to disperse clumps of grass clippings that are lying on the turf. In the case where it is desired to brush the turf, the nuts 96 and 98 on the adjustment post 90 will be placed so as to dispose the brush 80 in its lower position shown in FIGS. 1, 2 and 4. In the event it is desired to use the brush 80 to only brush the turf, the eccentric element 70 is adjusted to dispose the brush 80 in rearwardly spaced relationship to the roller 54, as shown in FIG. 4. Of course, the catcher 134 may be eliminated anytime that it is desired not to collect clippings.

While the brush 80 finds its greatest utility when used in conjunction with a rear-mounted grass catcher, it will be appreciated that, since many of the functions performed by the brush do not require the presence of a catcher, the brush will also have significant utility with cutting units that are arranged to deliver clippings to a front-mounted grass catcher.

We claim:

1. In a grass mower cutting unit including a frame having opposite upright side plates, a reel extending between and being rotatably mounted to the side plates, a bedknife extending between and being fixed to the side plates and having a cutting edge located in close proximity to a path traced by cutting blades of the reel, a rear roller located behind the bedknife and being rotatably mounted to the side plates for supporting the cutting unit on turf to be mown, a rotary brush extending between and being rotatably supported by the side plates and positioned for sweeping a path closely adjacent a rear location of the roller, and a drive coupled to the rotary brush for rotating the latter, the improvement comprising: mounting means supporting the brush for adjustment both into and away from engagement with the rear roller and into and away from engagement with the turf, whereby the brush can be positioned for simultaneously brushing the rear roller and turf surface or for brushing only the rear roller or the turf.

2. The grass mower cutting unit defined in claim 1 wherein said rear roller includes opposite ends defined by a pair of spindles including outwardly projecting threaded ends; said mounting means supporting the brush including a pair of brush support arms respectively having opposite ends of the brush rotatably mounted to rear ends thereof and having circular holes respectively provided in forward ends thereof; a circular eccentric element being received in each circular hole and having a shoulder engaging an outer surface of the associated brush support arm; each circular element having a smaller hole disposed in eccentric relationship to a central axis of the eccentric element and having an associated one of the outer threaded ends of the spindles received therein; and a nut being received on each of the spindles and holding the associated eccentric member in a selected adjusted position for holding the brush in engagement with the periphery of the rear roller or for holding the brush in spaced relationship to the periphery of the roller.

3. The grass mower cutting unit defined in claim 2 wherein the mounting means supporting the brush further includes a pair of support brackets respectively extend above the pair of brush support arms; a pair of threaded brush support posts having lower ends respectively pivotally connected to the pair of brush support arms; said pair of brush support brackets each being provided with an upright hole loosely receiving a respective one of the pair of support posts; and fastener means for holding each of the brush support posts in a desired vertical location relative to an associated one of the support brackets to thereby hold the brush in a desired adjusted position relative to the turf.

4. The grass mower cutting unit defined in claim 1 and further including a grass catcher being mounted to the rear of the cutting unit and including a forward opening located adjacent a rear portion of the brush; and said drive including means for selectively causing the brush to rotate counter to a direction that of the rear roller rotates when the cutting unit is traveling in a forward direction, whereby the brush will act to effect the movement of clippings into the grass catcher.

5. The grass mower cutting unit defined in claim 4 wherein the forward opening of the grass catcher includes a lower portion defined by a horizontal, transverse cut-off member; and said brush being located so that the cut-off member strips grass clippings from the brush as it rotates past the cut-off bar.

6. The grass mower cutting unit defined in claim 5 and further including adjustable means mounting said cut-off member to a remaining portion of the grass catcher for movement for keeping it in stripping relationship to the brush when the latter is adjusted toward and away from the turf or rear roller.

7. The grass mower cutting unit defined in claim 6 wherein said drive includes a reversible means for selectively changing the direction of rotation of the brush whereby, when the brush is adjusted to contact the turf, the drive may be used to either rotate the brush in the same direction as the rear roller so as to stand up the turf and disperse clippings or to rotate the bush in a direction opposite to that of the rear roller to disperse clippings.

8. In a grass cutting unit including a frame having opposite upright side plates, a reel extending between and being rotatably mounted to the side plates, a bedknife extending between and being fixed to the side plates and having a cutting edge located in close proximity to a path traced by cutting blades of the reel, a rear roller located behind the bedknife and being rotatably mounted to the side plates, a rotary brush extending between and being rotatably supported by the side plates and positioned for sweeping a path closely adjacent a rear location of the roller, and a drive selectively coupled to the rotary brush for rotating the latter in a direction opposite to that of the rear roller during forward movement of the cutting unit, the improvement comprising: a grass catcher being mounted to the rear of the cutting unit for receiving grass delivered by the reel after being severed at the cutting edge of the bedknife; said grass catcher including a forward opening disposed in close proximity to a path swept by the periphery of the brush whereby grass carried by the brush will be delivered to the catcher.

9. The grass mower cutting unit defined in claim 8 wherein the forward opening of the grass catcher includes a lower portion defined by a horizontal, transverse cut-off member; and said brush being located so that the cut-off member strips grass clippings from the brush as it rotates past the cut-off bar.

10. The grass mower cutting unit defined in claim 9 and further including adjustable means mounting the rotary brush for adjustment between an upper position wherein it is elevated above the turf and a lower position wherein it is in engagement with the turf so as to sweep at least an upper portion of the turf; and said drive including reversible means for selectively effecting rotation of the brush in the same direction as the rear roller when the brush is placed in its lower position.

11. The grass mower cutting unit defined in claim 9 and further including means mounting said rotary brush for adjustment into and from engagement with the turf; and an adjustable means mounting the cut-off member to the remainder of the grass catcher for movement towards and away from the brush whereby the cut-off member may be properly positioned so as to strip clippings from the brush for various positions of the brush.

12. The grass mower cutting unit defined in claim 9 and including adjustable means mounting said rotary brush for fore-and-aft and vertical adjustment for permitting the rotary brush to be adjusted toward and away from the rear roller and toward and away from the turf being traversed by the cutting unit whereby the brush may be used for cleaning the rear roller of grass clippings and/or for sweeping the top portion of the turf for lifting up bent over grass and/or dispersing clippings; and said drive including means for selectively effecting driving of the brush in a direction which is the same as or opposite to that of the rear roller.

13. In a grass cutting unit including a frame having opposite upright side plates, a reel extending between and being rotatably mounted to the side plates, a bedknife extending between and being fixed to the side plates and having a cutting edge located in close proximity to a path traced by cutting blades of the reel, a rear roller located behind the bedknife and being rotatably mounted to the side plates, a rotary brush extending between and being rotatably supported by the side plates and positioned for sweeping a path closely adjacent a rear location of the roller, and a drive coupled to the rotary brush for rotating the latter, the improvement comprising: said drive rotating the brush in a direction opposite to the direction of rotation of the rear roller during forward movement of the cutting unit; and a grass catcher mounted rearwardly of the brush and having a an opening disposed for receiving clippings carried by said brush.

* * * * *